(12) United States Patent
Torrey et al.

(10) Patent No.: US 11,370,044 B2
(45) Date of Patent: Jun. 28, 2022

(54) CHAIN GUARD WITH CHIP DEFLECTOR

(71) Applicant: Hubbell Incorporated, Shelton, CT (US)

(72) Inventors: Cameron Michael-Daniel Torrey, Tucson, AZ (US); Thomas Romeo Faucher, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 223 days.

(21) Appl. No.: 16/816,063

(22) Filed: Mar. 11, 2020

(65) Prior Publication Data

US 2020/0298327 A1  Sep. 24, 2020

Related U.S. Application Data (60) Provisional application No. 62/822,525, filed on Mar. 22, 2019.

(51) Int. Cl.
*B23D 57/02* (2006.01)
*B23D 59/00* (2006.01)

(52) U.S. Cl.
CPC ......... *B23D 57/023* (2013.01); *B23D 59/006* (2013.01)

(58) Field of Classification Search
CPC ...... B23D 57/023; B23D 59/006; B27B 17/00
See application file for complete search history.

(56) References Cited

U.S. PATENT DOCUMENTS

| 4,819,332 | A | * | 4/1989 | Sugihara | B27B 17/02 30/123.4 |
|---|---|---|---|---|---|
| 4,858,325 | A | * | 8/1989 | Miller | B27B 17/0083 30/373 |
| 5,427,007 | A | * | 6/1995 | Bystrom | B27B 17/0083 30/371 |
| 5,535,521 | A | * | 7/1996 | Alcorn | B27G 19/003 30/286 |
| 2006/0053629 | A1 | * | 3/2006 | Martin | B27B 9/02 30/123 |
| 2006/0185484 | A1 | * | 8/2006 | Sasaki | B23Q 11/005 83/100 |
| 2010/0083513 | A1 | * | 4/2010 | Pellenc | H02K 9/22 30/383 |
| 2010/0162571 | A1 | * | 7/2010 | Chambers | B23D 59/006 30/124 |
| 2012/0036972 | A1 | * | 2/2012 | Frolov | B27B 5/243 83/168 |
| 2017/0197285 | A1 | * | 7/2017 | Dragan | B23D 59/006 |
| 2019/0357446 | A1 | * | 11/2019 | McCue | B27B 17/0008 |
| 2020/0246998 | A1 | * | 8/2020 | Niiyama | H02K 9/06 |
| 2020/0306849 | A1 | * | 10/2020 | Hansen | B23D 59/006 |

* cited by examiner

*Primary Examiner* — Sean M Michalski
(74) *Attorney, Agent, or Firm* — Wissing Miller LLP (57) ABSTRACT

The present disclosure provides chain guards for chain saws attached to the end of a long reach pole. The chain guards include a chip deflector and a deflector cover that deflects and channels wood chips away from an operator. The chip deflector includes one or more curved surfaces configured to deflect the wood chips out of the chain guard and away for the operator while minimizing binding of the wood chips with the chain.

20 Claims, 7 Drawing Sheets

CHAIN GUARD WITH CHIP DEFLECTOR

CROSS-REFERENCE TO RELATED APPLICATIONS

The present disclosure is based on and claims benefit from U.S. Provisional Patent Application Ser. No. 62/822,525 filed on Mar. 22, 2019 entitled "Chain Guard with Chip Deflector" the contents of which are incorporated herein in their entirety by reference.

BACKGROUND

Field

The present disclosure relates generally to chain guards for chain saws. More particularly, the present disclosure relates to chain guards for chain saws attached to a distal end of a long reach pole that deflect and channel wood chips away from an operator controlling the chain saw from a proximal end of the long reach pole.

Description of the Related Art

Wood chips from chain saws attached to a distal end of a long reach pole have the potential to disburse in a number of directions including toward the operator of the chain saw who is holding the chain saw and operating the chain saw at the proximal end of the long reach pole. In some instances, the wood chips may rain down on the operator interfering with the operator and thus making it difficult for the operator to continue with a particular cut.

To limit and possibly prevent wood chips from interfering with the operator, it would be desirable to deploy a deflector to block or guide wood chips away from the operator.

SUMMARY

The present disclosure provides embodiments of chain guards for chain saws attached to the end of a long reach pole that deflect and channel wood chips away from the operator at the other end of the long reach pole. In one exemplary embodiment, the chain guard includes a chip deflector having an upper portion and a lower portion. The upper portion includes a mounting bracket having a first mounting aperture, a second mounting aperture and at least one curved surface used to deflect chips in a predefined direction. The first and second mounting apertures are used to secure the chain guard to a chain saw. The deflector cover is attached to the chip deflector to assist in deflecting and channeling chips away for an operator of the chain saw.

In another exemplary embodiment, the chain guard includes a chip deflector and a deflector cover attached to or monolithically formed into the chip deflector. The chip deflector includes an upper portion and a lower portion. The upper portion of the chip deflector has a first end and a second end spaced from the first end, and at least one curved surface used to deflect wood chips generated by the chain saw from the upper portion of the chip deflector toward the lower portion of the chip deflector. The lower portion of the chip deflector has a first end adjacent the first end of the of the upper portion and a second end spaced from the first end, and at least one curved surface used to deflect the wood chips directed from the upper portion of the chip deflector in a direction out of the chain guard. In this exemplary embodiment, the at least one curved surface of the upper portion is a concave surface or a convex surface, and the at least one curved surface of the lower portion is a concave surface or a convex surface. The concave surface may be a symmetrical surface or the concave surface may be an asymmetrical surface. Similarly, the convex surface may be a symmetrical surface or the convex surface may be an asymmetrical surface.

In another exemplary embodiment, the chain guard includes a chip deflector and a deflector cover attached to or monolithically formed into the chip deflector. The chip deflector has an upper portion and a lower portion. The upper portion of the chip deflector includes a first end and a second end spaced from the first end, first mounting aperture, a cover mounting aperture, a mounting bracket, and at least one curved surface. The first mounting aperture is positioned at or near the first end of the upper portion and is used to secure the chain guard to the chain saw. The cover mounting aperture is positioned at or near the second end of the upper portion. The mounting bracket extends from an outer surface of the upper portion and has a second mounting aperture used to secure the chain guard to the chain saw. The at least one curved surface is used to deflect wood chips generated by the chain saw from the upper portion of the chip deflector toward the lower portion of the chip deflector. The first and second mounting apertures are used to secure the chain guard to a chain saw. The lower portion of the chip deflector includes a first end adjacent the first end of the of the upper portion and a second end spaced from the first end, a cover mounting aperture positioned at or near the second end of the lower portion, and at least one curved surface used to deflect the wood chips directed from the upper portion of the chip deflector in a direction out of the chain guard.

The present disclosure also provides embodiments of chain saws that include the chain guards described above where the chain guards deflect and channel wood chips away from the operator at the other end of the long reach pole.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides embodiments of chain guards for chain saws attached to a distal end of a long reach pole that include a chip deflector and deflector cover that deflects and channels wood chips away from an operator at a proximal end of the long reach pole. The chain guard has a chip deflector and a deflector cover. For ease of description, the chip deflector may also be referenced herein as the "deflector." The deflector cover may also be referred to herein as the "cover."

Figure 1:
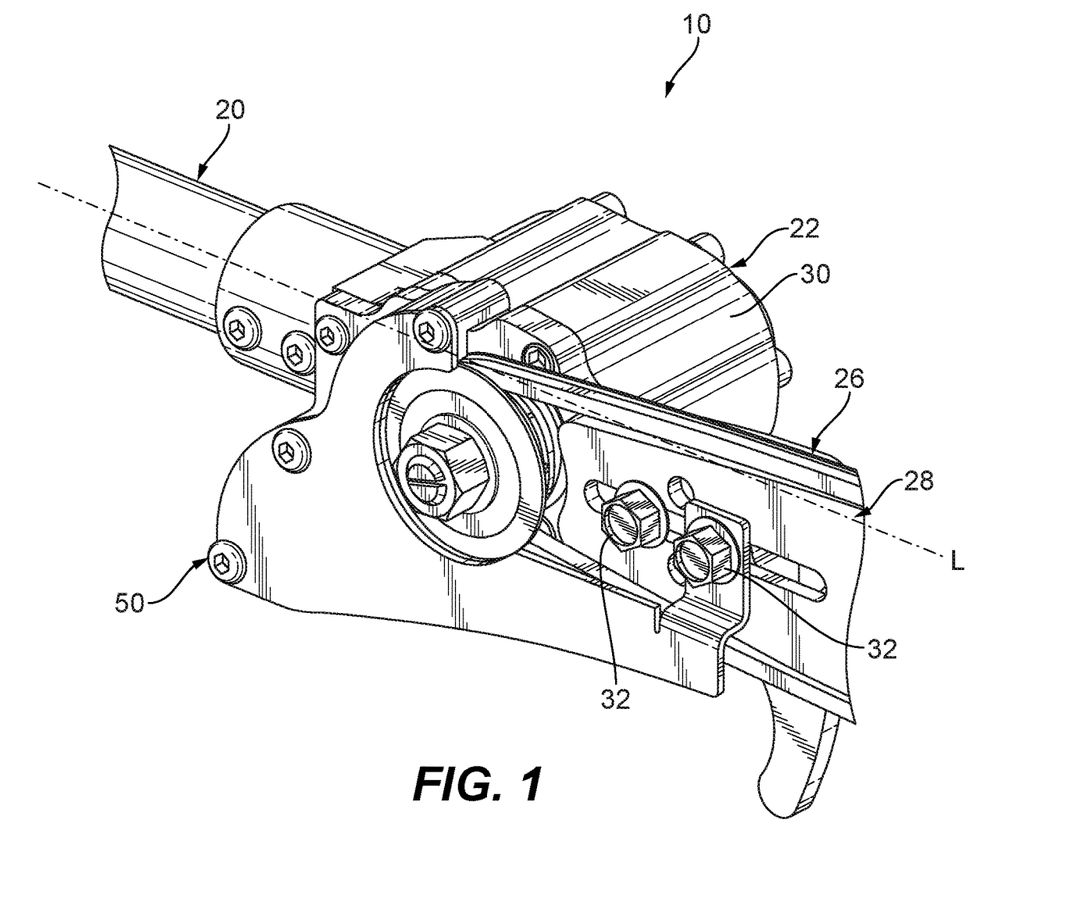
FIG. 1 is a perspective view of a chain saw attached to a distal end of a long reach pole, and illustrating an exemplary embodiment of a chain guard according to the present disclosure attached to the chain saw.
Figure 2:
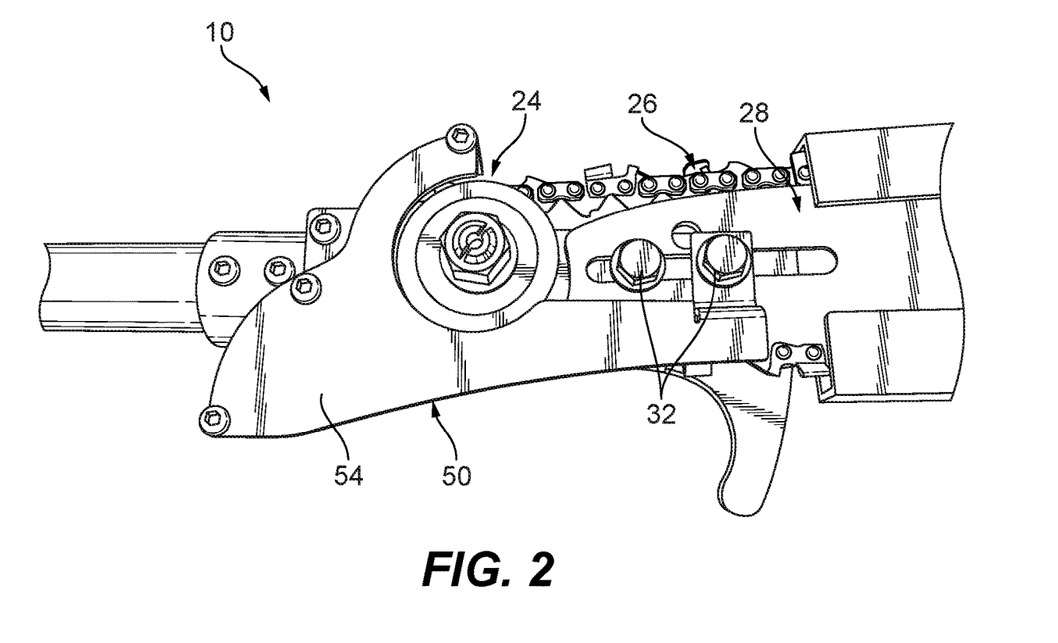
FIG. 2 is a side perspective view of the chain saw and chain guard of FIG. 1.
Figure 3:
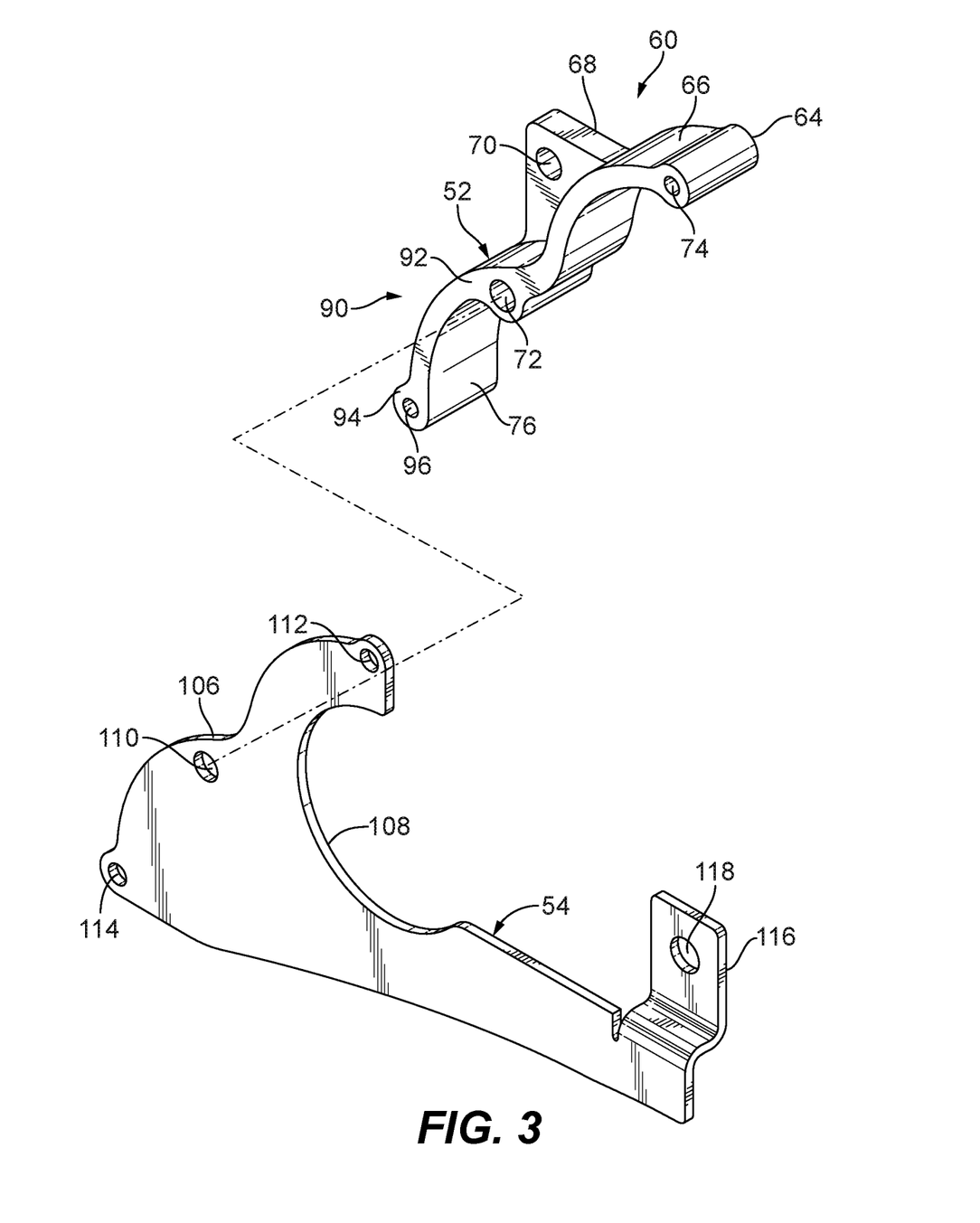
FIG. 3 is an exploded perspective view of the chain guard of FIG. 1, illustrating an exemplary embodiment of a chip deflector and a deflector cover.
Figure 4:
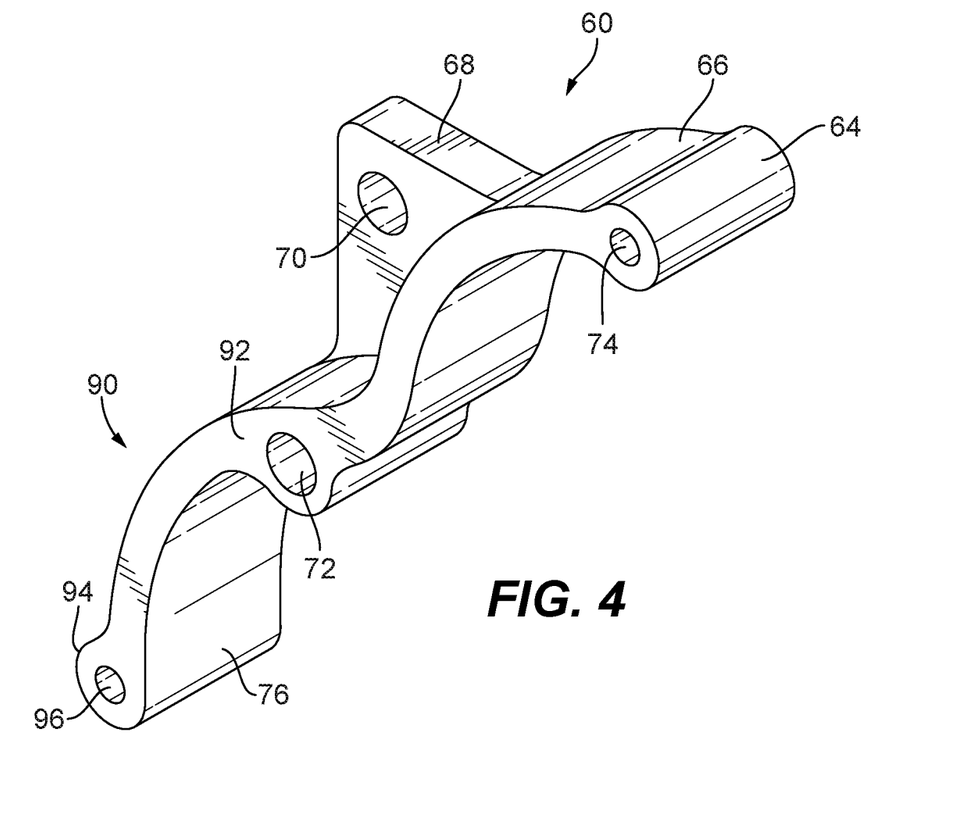
FIG. 4 is a perspective view of the chip deflector of FIG. 3.
Figure 5:
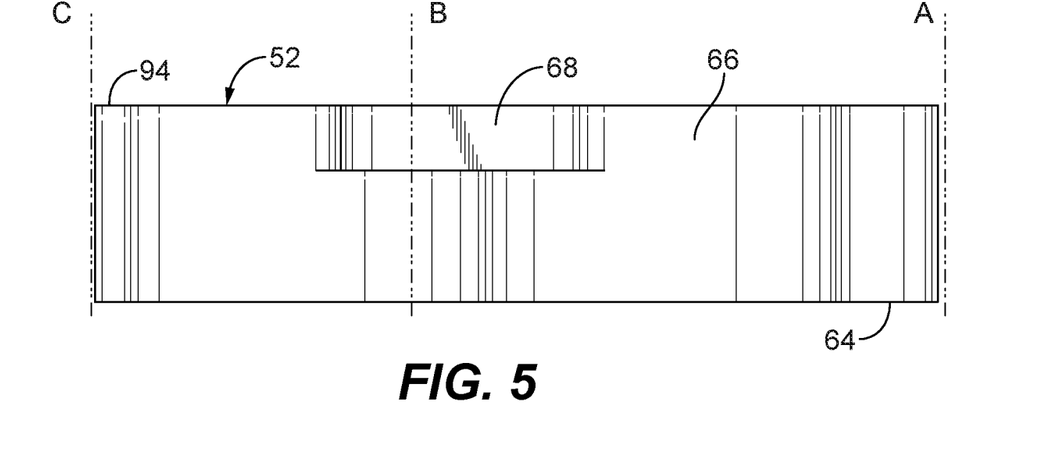
FIG. 5 is a top plan view of the chip deflector of FIG. 4.

Referring to FIGS. 1-3, a chain saw 10 attached to a distal end of long reach pole 20 that includes an exemplary embodiment of a chain guard 50 according to the present disclosure is shown. In this exemplary embodiment, the chain saw 10 is a hydraulic drive chain saw where hydraulic fluid drives a gear box 22 coupled to a clutch assembly 24 that drives the chain 26 of the chain saw 10. The chain 26 moves, e.g., rotates, relative to a bar 28 releasably attached to a housing 30 of the gear box 22 using bar retention bolts 32. The position of the bar 28 relative to the clutch assembly 24 can be adjusted to increase or reduce the tension on the chain 26 as is known. Controls (not shown) for the chain saw 10 are located at the proximal end of the long reach pole 20 and are operatively connected to the chain saw 10 as is known. The chain guard 50 includes a deflector 52 and a cover 54 configured to deflect and channel wood chips resulting from the operation of the chain saw 10 in a direction away from the operator.

Figure 6:
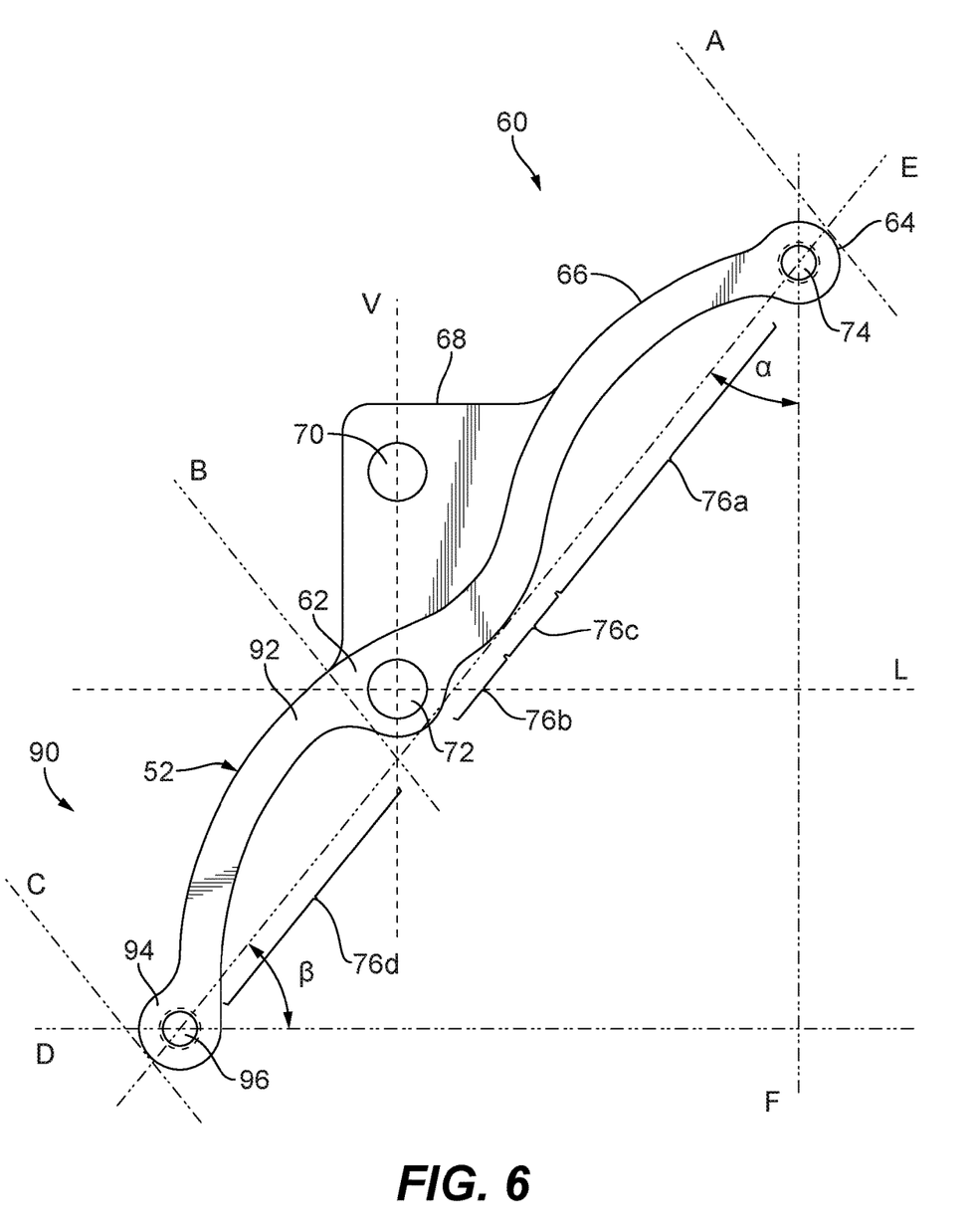
FIG. 6 is a side elevation view of the chip deflector of FIG. 4.
Figure 7:
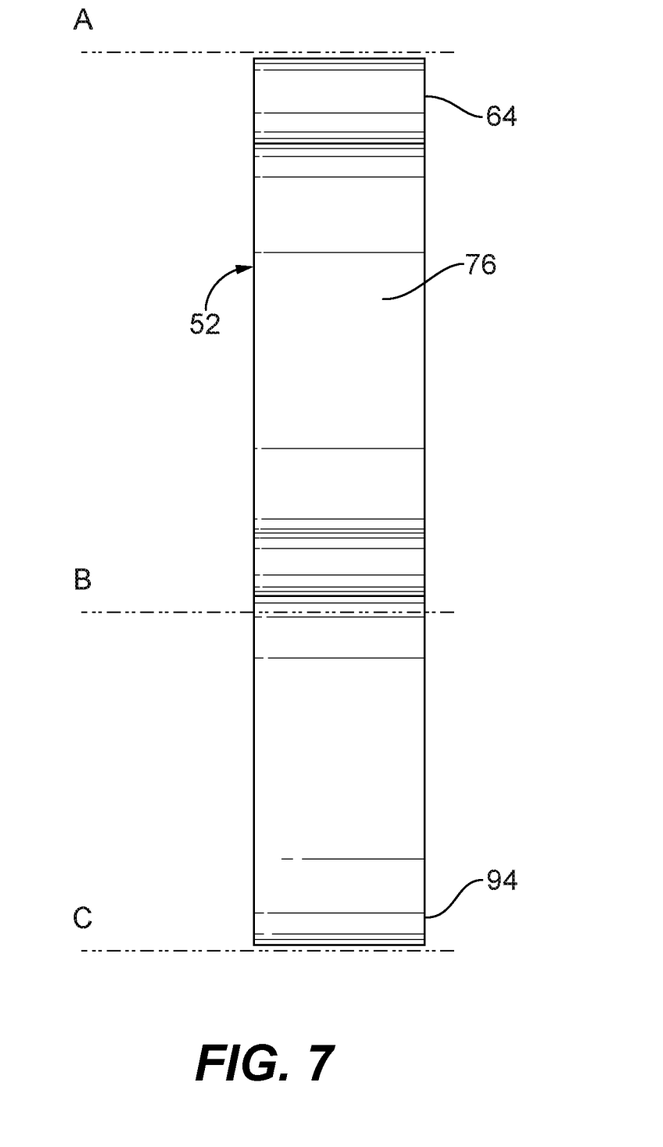
FIG. 7 is a bottom plan view of the chip deflector of FIG. 4.

Referring to FIGS. 1-7, the deflector 52 is configured to be attached to the gear box housing 30 (or a chain saw motor housing) at a point adjacent the clutch assembly 24 and behind the chain 26, as shown in FIGS. 1 and 2, so that the deflector 52 can deflect wood chips generated by the cutting action of the chain 26 away from the operator. More specifically, the deflector 52 includes an upper portion 60 generally represented between lines "A" and "B," seen in FIG. 6, and a lower portion 90 generally represented between lines "B" and "C" in FIG. 6. The upper portion 60 has a first end 62 adjacent a first end 92 of the lower portion 90 and a second end 64 spaced from the first end 62. The upper portion 60 includes a mounting bracket 68 extending from an outer surface 66 of the deflector 52. The mounting bracket 68 includes a mounting aperture 70. At or near the first end of the upper portion 60 is a second mounting aperture 72. The mounting aperture 70 and the mounting aperture 72 are vertically aligned along a vertical axis "V," as shown in FIG. 6 to ensure the deflector 52 is fixed in a desired position relative to the gear box housing 30. More specifically, a center of the mounting aperture 70 is vertically aligned with a center of the mounting aperture 72. The vertical axis "V" is substantially orthogonal to the horizontal axis "L" of the long reach pole 20, seen in FIGS. 1 and 6. The mounting apertures 70 and 72 are used to attach the chain guard 50 to the gear box housing 30 (or a chain saw motor housing) so that the deflector 52 is oriented to deflect wood chips as described in more detail below. The upper portion 60 of the deflector 52 also includes a first cover aperture 74 at the second end 64. The first cover aperture 74 is used when securing the cover 54 to the deflector 52. An inner surface 76 of the deflector 52 in the upper portion 60 includes one or more curved surfaces used to deflect wood chips in a direction toward the lower portion 90. In the exemplary embodiment shown, the inner surface 76, seen in FIG. 3, of the deflector 52 in the upper portion 60 includes three curved surfaces, namely concave surfaces 76a and 76b and convex surface 76c, seen in FIG. 6. The concave surfaces may be symmetrical or they may be asymmetrical. For example, in a symmetrical concave surface the radius of curvature would be constant along a length of the upper portion 60 of the deflector 52, and in an asymmetrical concave surface the radius of curvature would differ along a length of the upper portion 60 of the deflector 52. Similarly, the convex surfaces may be symmetrical or they may be asymmetrical. For example, in a symmetrical convex surface the radius of curvature would be constant along a length of the upper portion 60 of the deflector 52, and in an asymmetrical concave surface the radius of curvature would differ along a length of the upper portion 60 of the deflector 52. The curved surfaces 76a, 76b and 76c are configured to deflect wood chips from an area of the chain saw 10 where the chain 26 engages the clutch assembly 24 in a direction toward the lower portion 90 while minimizing and possibly preventing the wood chips from stacking within the chain guard 50 and binding against the chain 26. The curved surfaces 76a, 76b and 76c may be symmetrical or asymmetrical in order to achieve the desired deflection of wood chips.

Continuing to refer to FIGS. 3-7, the lower portion 90 of the deflector 52 has a first end 92 and a second end 94 spaced from the first end 92. The lower portion 90 includes a second cover aperture 96 at the second end 94. The second cover aperture 96 is used when securing the cover 54 to the deflector 52. The inner surface 76 of the deflector 52 in the lower portion 90 includes one or more curved surfaces used to deflect wood chips in a direction out of the chain guard 50. In the exemplary embodiment shown, the inner surface 76 of the deflector 52 in the lower portion includes curved surface 76d. The curved surface 76d is configured to deflect wood chips from the chain 26 and the upper portion 60 in a direction out of the chain guard 50, while minimizing and possibly preventing the wood chips from stacking within the chain guard 50 and binding against the chain 26. The curved surface 76d may be symmetrical or asymmetrical in order to achieve the desired deflection of wood chips out of the chain guard 50.

Referring to FIGS. 1 and 6, the orientation of the deflector 52 relative to the gear box housing 30 should be such that the lower portion 90 of the deflector is offset from the upper portion 60, as shown. More specifically, a center of the first cover aperture 74 of the upper portion 60 and a center of the second cover aperture 96 of the lower portion 90 should be aligned as represented by line "E" so that the are at predefined angles relative to the longitudinal axis "L" of the long reach pole 20, as represented by line "D" which is substantially parallel to the longitudinal axis "L," and line "F" which is substantially parallel to the vertical axis "V." The predefined angle "α" between lines "E" and "F" may be in the range of about 20 degrees and about 70 degrees. The predefined angle "β" between lines "D" and "E" may be in the range of about 20 degrees and about 70 degrees. The predefined angles "α" and "β" may be the same or they may differ.

The upper portion 60 and the lower portion 90 of the deflector 52 may be a unitarily or monolithically formed member, or the upper portion 60 and the lower portion 90 of the deflector 52 may be separate members joined together using mechanical fasteners or welds. Preferably, the deflector 52 is made of a metallic material, such as aluminium.

Figure 8:
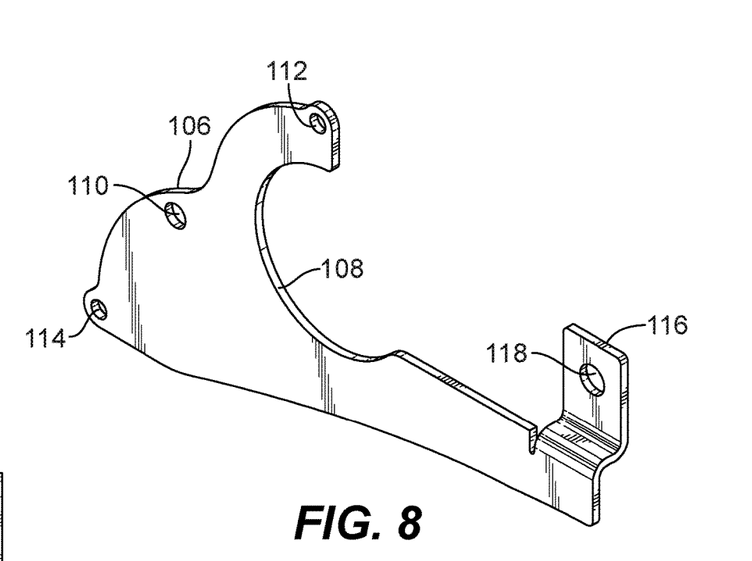
FIG. 8 is a perspective view of the deflector cover of FIG. 3.
Figure 9:
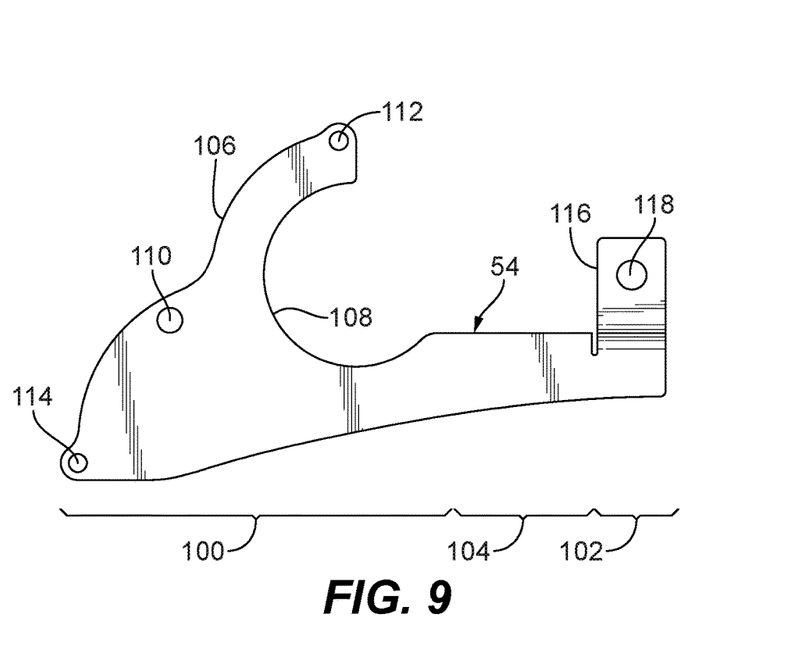
FIG. 9 is a side elevation view of the deflector cover of FIG. 3.
Figure 10:
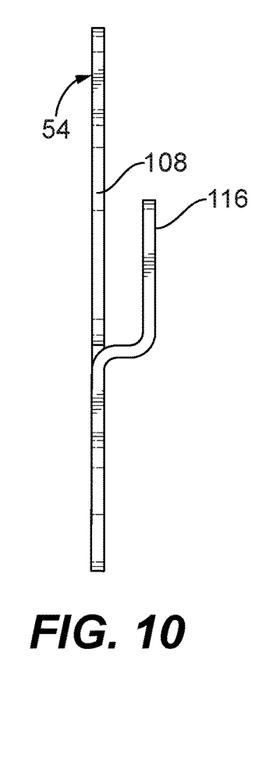
FIG. 10 is a front elevation view of the deflector cover of FIG. 3.

Referring now to FIGS. 8-10, an exemplary embodiment of the cover 54 is shown. The cover 54 is a plate that includes a deflector portion 100, a bar mounting portion 102 and an intermediate portion 104 between the deflector portion and the bar mounting portion. An outside side edge 106 of the cover 54 in the deflector portion 100 is preferably configured to conform to the shape of the outer surface 66 of the deflector 52. However, the outside side edge 106 of the cover 54 can be in any shape. An inside side edge 108 of the cover 54 in the deflector portion 100 is preferably configured to conform to the shape of the clutch assembly 24 of the chain saw 10. However, the inside side edge 108 of the cover 54 can be in any shape. The deflector 52 includes cover mounting apertures 110, 112 and 114 used to secure the cover 54 to the deflector 52 with, for example, mechanical fasteners such as set screws. Cover mounting aperture 110 is positioned to align with the second mounting aperture 72 in the deflector 52. The cover mounting aperture 112 is positioned to align with the first cover aperture 74 in the deflector 52. The cover mounting aperture 114 is positioned to align with the second cover aperture 96 in the deflector 52. The deflector portion 100 of the cover 54 is substantially flat and is provided to cover the deflector and a portion of the chain 26 so that the deflector and portion of the chain are covered as the chain 26 is in motion. The deflector 52 and cover 54 also form a channel through which wood chips are directed in a direction away from the operator. The bar mounting portion 102 of the cover 54 includes an offset bar mounting bracket 116 that has a cover mounting aperture 118 used when securing the bar mounting portion 102 of the cover 54 to the bar 28 of the chain saw 10. The offset of the bar mounting bracket 116 should be sufficient to permit the chain of the chain saw to pass between the bar 28 and the cover 54, so that the chain 26 is hidden by the bar mounting portion 102. The intermediate portion 104 of the cover 54 is substantially flat and is provided to cover the chain 26 so that it is hidden as the chain is in motion.

While the cover 54 is described above as being releasable secured to the deflector 52 using, for example, set screws. The present disclosure contemplates that the cover 54 may be permanently secured to the deflector 52 using, for example, welds or adhesives. In another embodiment, the cover 54 and deflector 52 may be a monolithically formed structure. Preferably, the cover 54 is made of a metallic material, such as aluminium.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A chain guard for a chain saw attached to an end of a long reach pole, the chain guard comprising:
    a chip deflector having an upper portion and a lower portion:
        the upper portion of the chip deflector including:
            a first end and a second end spaced from the first end; and
            at least one curved surface used to deflect wood chips generated by the chain saw from the upper portion of the chip deflector toward the lower portion of the chip deflector;
        the lower portion of the chip deflector including:
            a first end adjacent the first end of the of the upper portion and a second end spaced from the first end; and
            at least one curved surface configured to deflect the wood chips directed from the upper portion of the chip deflector in a direction out of the chain guard; and
    a deflector cover attached to the chip deflector.

2. The chain guard according to claim 1, wherein the upper portion of the chip deflector includes a plurality of curved surfaces.

3. The chain guard according to claim 2, wherein at least one of the plurality of curved surfaces in the upper portion of the chip deflector is a concave surface, and at least one of the plurality of curved surfaces in the upper portion of the chip deflector is a convex surface.

4. The chain guard according to claim 3, wherein the at least one concave surface is a symmetrical surface or an asymmetrical surface, and the at least one convex surface is a symmetrical surface or an asymmetrical surface.

5. The chain guard according to claim 1, wherein the at least one curved surface of the lower portion is a concave surface or a convex surface.

6. The chain guard according to claim 5, wherein the concave surface is a symmetrical surface or an asymmetrical surface, or the at least one convex surface is a symmetrical surface or an asymmetrical surface.

7. A chain guard for a chain saw attached to an end of a long reach pole, the chain guard comprising:
    a chip deflector having an upper portion and a lower portion:
        the upper portion of the chip deflector including:
            a first end and a second end spaced from the first end;
            a first mounting aperture positioned at or near the first end of the upper portion and used to secure the chain guard to the chain saw;
            a cover mounting aperture positioned at or near the second end of the upper portion;
            a mounting bracket extending from an outer surface of the upper portion and having a second mounting aperture used to secure the chain guard to the chain saw; and
            at least one curved surface configured to deflect wood chips generated by the chain saw from the upper portion of the chip deflector toward the lower portion of the chip deflector, wherein the first and second mounting apertures are used to secure the chain guard to a chain saw;
        the lower portion of the chip deflector including:
            a first end adjacent the first end of the of the upper portion and a second end spaced from the first end;
            a cover mounting aperture positioned at or near the second end of the lower portion; and
            at least one curved surface used to deflect the wood chips directed from the upper portion of the chip deflector in a direction out of the chain guard; and
    a deflector cover attached to the chip deflector.

8. The chain guard according to claim 7, wherein the upper portion of the chip deflector includes a plurality of curved surfaces.

9. The chain guard according to claim 8, wherein at least one of the plurality of curved surfaces in the upper portion of the chip deflector is a concave surface, and at least one of the plurality of curved surfaces in the upper portion of the chip deflector is a convex surface.

10. The chain guard according to claim 9, wherein the at least one concave surface is a symmetrical surface or an asymmetrical surface.

11. The chain guard according to claim 9, wherein the at least one convex surface is a symmetrical surface or an asymmetrical surface.

12. The chain guard according to claim 7, wherein the lower portion of the chip deflector includes a single curved surface.

13. The chain guard according to claim 7, wherein a center of the second mounting aperture is vertically aligned with a center of the first mounting aperture.

14. A chain saw comprising:
a gear box coupled to a clutch assembly, a bar extending from a housing of the gear box and a chain coupled to the clutch assembly and bar so that the chain moves along the bar; and
a chain guard attached to the gear box housing and the bar, the chain guard including a chip deflector and a deflector cover attached to the chip deflector;
wherein the chip deflector includes an upper portion and a lower portion:
the upper portion of the chip deflector having:
a first end and a second end spaced from the first end;
a first mounting aperture positioned at or near the first end of the upper portion and used to secure the chain guard to the chain saw;
a cover mounting aperture positioned at or near the second end of the upper portion;
a mounting bracket extending from an outer surface of the upper portion and having a second mounting aperture used to secure the chain guard to the chain saw; and
at least one curved surface configured to deflect wood chips generated by the chain saw from the upper portion of the chip deflector toward the lower portion of the chip deflector, wherein the first and second mounting apertures are used to secure the chain guard to a chain saw;
the lower portion of the chip deflector including:
a first end adjacent the first end of the of the upper portion and a second end spaced from the first end;
a cover mounting aperture positioned at or near the second end of the lower portion; and
at least one curved surface used to deflect the wood chips directed from the upper portion of the chip deflector in a direction out of the chain guard.

15. The chain guard according to claim 14, wherein the upper portion of the chip deflector includes a plurality of curved surfaces.

16. The chain guard according to claim 15, wherein at least one of the plurality of curved surfaces in the upper portion of the chip deflector is a concave surface, and at least one of the plurality of curved surfaces in the upper portion of the chip deflector is a convex surface.

17. The chain guard according to claim 16, wherein the at least one concave surface is a symmetrical surface or an asymmetrical surface.

18. The chain guard according to claim 16, wherein the at least one convex surface is a symmetrical surface or an asymmetrical surface.

19. The chain guard according to claim 14, wherein the lower portion of the chip deflector includes a single curved surface.

20. The chain guard according to claim 14, wherein a center of the second mounting aperture is vertically aligned with a center of the first mounting aperture.

* * * * *